(12) United States Patent
Walker et al.

(10) Patent No.: US 10,290,126 B2
(45) Date of Patent: May 14, 2019

(54) COMPUTERIZED SYSTEMS AND METHODS FOR GRAPH DATA MODELING

(71) Applicant: Oath Inc., Dulles, VA (US)

(72) Inventors: Travis Adam Walker, South Riding, VA (US); Mohammad Suhale Malang Khader, Ashburn, VA (US)

(73) Assignee: Oath Inc., Dulles, VA (US)

(*) Notice: Subject to any disclaimer, the term of this patent is extended or adjusted under 35 U.S.C. 154(b) by 126 days.

(21) Appl. No.: 14/557,410

(22) Filed: Dec. 1, 2014

(65) Prior Publication Data

US 2016/0005197 A1   Jan. 7, 2016

Related U.S. Application Data

(60) Provisional application No. 62/019,669, filed on Jul. 1, 2014.

(51) Int. Cl.
*G06T 11/20* (2006.01)
*G06F 17/30* (2006.01)

(52) U.S. Cl.
CPC ...... *G06T 11/206* (2013.01); *G06F 17/30569* (2013.01)

(58) Field of Classification Search
None
See application file for complete search history.

(56) References Cited

U.S. PATENT DOCUMENTS

| | | | | |
|---|---|---|---|---|
| 7,165,060 B2* | 1/2007 | Foster | .................... | G06Q 10/10 |
| 7,962,512 B1* | 6/2011 | Sholtis | .............. | G06F 17/30566 707/777 |
| 2002/0087622 A1* | 7/2002 | Anderson | .......... | H04N 1/00148 709/203 |
| 2009/0164387 A1* | 6/2009 | Armstrong | ............ | G06F 17/241 705/36 R |
| 2011/0066602 A1* | 3/2011 | Studer | ................. | G06F 17/2264 707/690 |
| 2011/0246816 A1* | 10/2011 | Hsieh | ................ | G06F 17/30563 714/4.12 |
| 2012/0016901 A1* | 1/2012 | Agarwal | ........... | G06F 17/30569 707/769 |
| 2014/0032617 A1* | 1/2014 | Stanfill | ............. | G06F 17/30557 707/809 |
| 2014/0074770 A1* | 3/2014 | Morsi | ............... | G06F 17/30551 707/600 |
| 2016/0205137 A1* | 7/2016 | Babb | ....................... | H04L 63/20 726/1 |

* cited by examiner

*Primary Examiner* — Tize Ma
(74) *Attorney, Agent, or Firm* — Bookoff McAndrews, PLLC

(57) ABSTRACT

Systems, methods, and computer-readable media are provided for graph data modeling. In accordance with one implementation, a method is provided that includes operations performed by at least one processor. The operations of the method include receiving raw data and determining a model for the raw data, wherein the model defines the graph structure for the raw data. The method also includes converting the raw data to fit the model, and generating at least a portion of a graph based on the raw data and the model, wherein the graph produces modeled data. The method also includes archiving the graph.

19 Claims, 4 Drawing Sheets

COMPUTERIZED SYSTEMS AND METHODS FOR GRAPH DATA MODELING

CROSS-REFERENCE TO RELATED APPLICATION(S)

This application claims priority to U.S. Provisional Application No. 62/019,669, titled "Computerized Systems and Methods for Graph Data Modeling," and filed Jul. 1, 2014, which is incorporated herein by reference.

TECHNICAL FIELD

The present disclosure relates to computerized systems and methods for data modeling and, more generally, to the field of data processing. More particularly, and without limitation, the present disclosure relates to methods, systems, and computer readable media for processing and converting raw data into graphs, and retrieving modeled data from a graph database.

BACKGROUND INFORMATION

Graph databases utilize graph structures with nodes (also referred to as "vertices"), edges, and properties to organize and store data. Some graph databases may not be property-based. For example, Resource Description Framework (RDF) may utilize a triple store, where properties are emulated using additional nodes. Regardless, such data structures possess unique properties which allow for powerful and flexible data storage. For example, because every element in a graph provides a direct pointer to adjacent elements, global index lookups are not necessary. Additionally, a graph structure may be defined to label any property of a node, allowing one to easily identify patterns between the connections and interconnections of nodes.

However, graph databases are difficult to navigate and model. Further, significant knowledge of graph theory is required to properly design and manage graph structures. Due to a rise in the popularity of graph databases, simplification is required to allow a broader audience of developers to program for and interact with graph databases. Existing techniques attempt to allow easier interaction with a graph database by mapping graph data to an object by using, for example, an Object Graph Model (OGM).

Conventional techniques related to graph databases suffer one or more drawbacks, such as persistence of object-relational impedance mismatch, which prohibits by-reference pointers. Also, conventional mapping techniques are limited in that they can only represent and return data as it statically exists, because mapping does not modify the relationships of the underlying raw data. These techniques do not take relationships and metadata into context.

SUMMARY

In accordance with embodiments of the present disclosure, computer-implemented systems, methods, and computer-readable media are provided for converting raw data into a graph structure.

In accordance with an embodiment, a computer-implemented system is provided for converting raw data into a graph structure. The system may comprise a storage device that stores instructions and at least one processor that executes the instructions in the storage device. At least one processor may be configured with the instructions to receive raw data and determine a model for the raw data, wherein the model defines the graph structure for the raw data. At least one processor may also be configured with the instructions to convert the raw data to fit the model, generate at least a portion of a graph based on the raw data and the model, wherein the graph produces modeled data, and archive the graph.

In accordance with another embodiment, a computerized method is provided for graph data modeling. The method comprises operations performed by at least one processor. The operations may include receiving raw data and determining a model for the raw data, wherein the model defines the graph structure for the raw data. The operations also may include converting the raw data to fit the model and generating at least a portion of a graph based on the raw data and the model. The graph may produce modeled data. In addition, the operations may include archiving the graph.

Computer-readable media implementing the above method are also disclosed. Additional embodiments and related features of the present disclosure are presented herein.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the presently disclosed embodiments.

DETAILED DESCRIPTION OF EXEMPLARY EMBODIMENTS

Figure 1:
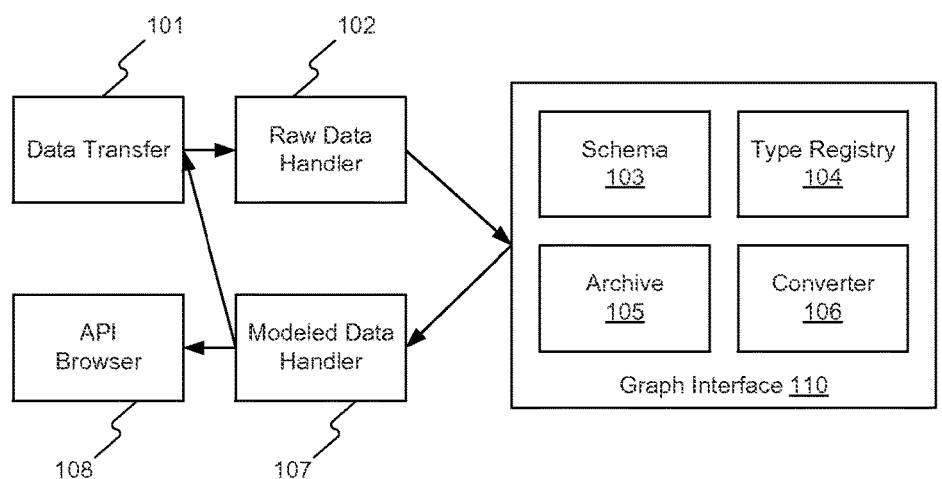
FIG. 1 illustrates an exemplary system for implementing embodiments of the present disclosure.

Embodiments of the present disclosure will now be described with reference to examples and the accompanying figures. The embodiments of FIGS. 1-4 are provided for purposes of illustration, and not limitation, and may be implemented together or individually.

Embodiments of the present disclosure encompass systems, methods, and computer-readable media for processing and modeling graph data. Such modeling may be used in social networks and access control systems, for example. In accordance with certain embodiments, raw data may be converted to a graph format by organizing the raw data to fit into existing "models," which include schema detailing how portions of the raw data may be organized in a graph. Once the raw data is converted and stored in a graph form, the system may receive queries for modeled data and provide the corresponding converted graph data.

Embodiments of the present disclosure include systems, methods, and computer-readable media that define or provide "models." Each model may detail how certain classes of raw data may be organized as a graph (e.g., how raw data may be conveyed in the nodes, properties, and edges of a graph structure).

A graph structure may include nodes having properties and edges. Properties may convey a quality of the subject of the node (also referred to as a "vertex"). Edges may describe relational properties of the subject of the node. For example, a node may correspond to a user. The user may have a username and/or identification code as properties. The user may also have, for example, edges (or links) to groups of which the user is a member and images in which the user is tagged.

Raw data may include user input, files (e.g., images, audio, video, etc.), and text, for example. Raw data may include data to model multiple nodes, a single node, or portions of a graph (e.g., property(s) and/or edge(s)). In some embodiments, the raw data may describe a relationship amongst various data items; however, the raw data itself may not self-describe how the data could be converted into a graph.

Models may include formats for representing certain kinds or classes or raw data in a graph structure. For example, a model may define a certain portion of raw data to be a property of a node. In other examples, a model may identify a portion of raw data to be an edge, while other portions of raw data identify the start and end nodes for the edge. For example, raw data may describe that user "John" may be tagged in image number "5183." In this example, a picture tagging model may identify an edge ("tagged in") from a user node ("John") to and image node ("5183").

Models may be further standardized by using "Types." Types may identify a singular format for common or recurring kinds of data, so that the same graph structure may be re-used in similar cases. For example, a Type may specify that, to identify a user as being depicted in a certain image, an edge may be created from the node of the user to the node of the image with a standardized edge label (e.g., "tagged in"). Types may identify a particular kind of node (or "vertex") as an "EntityType." For example, a user node may be an EntityType. An EntityType may include standard vertices ("RelationshipType") and properties ("PropertyType"). Having standardized, regular formats for commonly stored kinds of data may allow for easier aggregation and manipulation of data in a graph. An instance of an EntityType may be referred to as an "EntityModel." For example, there may be an EntityType corresponding to a user, where "John" would be an EntityModel of the user EntityType. The user may have a PropertyType identification number (e.g., "21386"). There may exist a RelationshipType for being "tagged in" a picture, for example. This may allow for a simplified aggregation of all the images that John is depicted in by querying all of the "tagged in" edges of node "John." The EntityTypes, RelationshipTypes, and PropertyTypes may make up for the lack of schema definitions in a relational database. Further, the use of Types may allow a developer to implicitly describe, modify, and/or adapt their own definition, with the physical storage automatically adapting to accommodate the Type. This may contrast with a traditional database schema that may be more restrictive and cumbersome to modify.

PropertyTypes may be defined separately from EntityTypes so that commonalities may be shared. In an embodiment, many different EntityTypes may utilize the same PropertyType. For example, an API key or user identifier may be a PropertyType that is used in several different EntityTypes. The PropertyType may be required in certain EntityTypes, optional in some EntityTypes, and not permitted in other EntityTypes. This may allow flexibility in the definition of the EntityTypes and the PropertyTypes.

In accordance with certain embodiments, a registry implemented with a memory or storage device may store Types (e.g., EntityTypes, PropertyTypes, RelationshipTypes). Having a centralized store of the Types may allow a user or server to query to see if a certain Type exists. In certain embodiments, the registry may be used to confirm or validate graph structures for compliance with a particular set of Types.

FIG. 1 illustrates an exemplary system 100 for implementing embodiments of the present disclosure. As shown in FIG. 1, system 100 includes data transferer 101, raw data handler 102, graph interface 110, modeled data handler 107, and Application Programming Interface (API) browser 108. These functional blocks of system 100 may be implemented using any suitable combination of hardware, software, and/or firmware, such as a set of instructions and/or computer or server. The number and arrangement of components in FIG. 1 is merely provided for illustration. It will be appreciated that other arrangements and quantity components may be provided to implement the system.

In some embodiments, data transferer 101 receives data, such as raw data or requests for modeled data. Data transferer 101 may receive raw data in large batches or individual transmissions. Data transferer 101 may receive raw from servers, personal computers, handheld devices, or other computing devices (e.g., smart televisions, smart watches, etc.). Data transferer 101 may receive raw data manually or automatically. For example, a user may transmit raw data to data transferer 101 by providing input via a keyboard, mouse, or touchscreen. In another example, a server may automatically transfer raw data to data transferer 101 based on a predefined trigger or scheduled cycle. For example, a smartphone may upload to data transferer 101 all photographs taken during the day, each evening. Data transferer 101 may be implemented using Representational State Transfer (REST), Remote Procedure Calls (RPC), and/or any other suitable standard for receiving data. In some embodiments, data transferer 101 may not modify the raw data prior to transferring the raw data to raw data handler 102.

In some embodiments, raw data handler 102 receives and processes raw data for subsequent manipulation. Raw data handler 102 may receive raw data from data transferer 101. Raw data handler 102 may process the raw data to prepare it for graph conversion.

In an embodiment, raw data handler 102 may receive raw data in large batches. Before further processing, raw data handler 102 may split the large batch into individualized raw data segments. In an embodiment, raw data handler 102 may recognize repeated patterns in large batches and split the large batches based on the patterns. For example, if raw data handler 102 receives a group of pictures, each having a caption, raw data handler 102 may split each picture and corresponding caption into an individualized segment.

In an embodiment, raw data handler 102 may further process data in preparation for graph conversion. For example, raw data handler 102 may review the fields of the raw data. In certain embodiments, raw data handler may identify the input type. For example, raw data handler may determine that the raw data corresponds to a file, photo, video, string, text, or number. For example, raw data handler 102 may determine that raw data includes a JPEG or GIF image file. In response to this determination, raw data handler 102 may label the raw data as a photo. Raw data handler 102 may determine and identify required fields. For example, raw data handler 102 may determine that a photo requires a caption and an owner. Raw data handler 102 may further check the raw data to determine whether each photo in the raw data has a caption and an owner. Raw data handler 102 may determine optional and disallowed fields. Further, raw data handler 102 may reject the raw data in part or whole due to the inclusion of disallowed fields. For example, additional properties of the photos may be present in the raw data, such as titles, dates, and locations for each photo. Raw data handler 102 may determine that dates and locations are optional fields, however titles are not allowed. Raw data handler 102 may reject the corresponding photo and various fields or simply delete the disallowed title field. Raw data handler 102 may also determine the storage type. For example, raw data handler 102 may determine that the photo must be stored as a JPEG with strings for the caption and date. Raw data handler 102 may format the raw data to fit the required specifications for a photo.

In an embodiment, raw data handler 102 may verify the raw data. Raw data handler 102 may also eliminate erroneous data before further processing. For example, raw data handler 102 may check the raw data for accuracy and inconsistencies. Proofreading raw data may prevent errors in further processing by system 100. When raw data handler 102 is finished processing the raw data, raw data handler 102 may transfer the raw data to graph interface 110.

Graph interface 110 may facilitate interaction with a graph database. Graph interface 110 may include an exemplary schema 103, type registry 104, archive 105, and converter 106. Each depicted functional block of graph interface 110 may act independently and in parallel. Graph interface 110 may receive raw data, Types, and queries. Graph interface 110 may also provide modeled data, stored Types, and responses to queries via, for example, an API. When raw data is first received at graph interface 110, schema 103 may act on the raw data.

Schema 103 may determine which, if any, model corresponds to raw data. The raw data may self-identify as corresponding to a particular model. For example, schema 103 may detect a label in the raw data identifying a particular model or Type. Schema 103 may further review the raw data to determine a model for the data. For example, raw data may include a JPEG image, and schema 103 may determine that the raw data corresponds to a photo model.

Converter 106 may convert the raw data into a graph structure based on the model corresponding to the raw data. Converter 106 may receive raw data and generate nodes, properties, and/or edges based on the raw data. The Models and Types may determine how the raw data is converted to a graph structure. Converter 106 may edit an existing graph structure, add an addition to an existing graph structure, or create a new graph structure.

In an embodiment, converter 106 may use raw data to edit or modify an existing graph structure. Converter 106 may reroute an edge of a node, alter a property of a node, or change the node Type based on the raw data. For example, raw data may indicate that user "A" is named "Jack." Converter 106 may retrieve the node corresponding to user "A," which has a name property of "John," and change the name property to "Jack." In another example, the raw data may state that user "A" is no longer a member of the cycling club. Converter 106 may delete the edge between the node corresponding to user "A" and the node corresponding to the cycling club. In a further example, converter 106 may create two edges between user "A" and user "W," in response to receiving data indicating that user "A" and user "W" are "colleagues" on a social network website (one edge indicating User "A" is a colleague of User "W," and a second edge indicating User "W" is a colleague of User "A").

In an embodiment, converter 106 may add on to an existing graph structure. Converter 106 may create nodes or edges based on raw data to place in an existing graph. For example, the raw data may be a photo upload for user "A." Converter 106 may create a new node for the photo and an edge to the node corresponding to user "A."

In an embodiment, converter 106 may create a new graph structure. Converter 106 may create nodes without any edges to nodes of any existing graph structure. For example, the raw data may include new users as members of a new group, such as a juggling group, without additional data. Converter 106 may create nodes corresponding to each of the new users and the juggling group, with edges between each new user node and the juggling group node. The new nodes may eventually contain an edge to larger graph structures or the user and group nodes may remain an isolated graph.

In an embodiment, converter 106 also converts data from the graph structure to modeled data. Converter may receive a request for a certain portion of data and the corresponding node. Converter 106 may convert the necessary graph structures into modeled data variables (e.g., files, strings, text, etc.). For example, Graph interface may receive a query for user "A." Converter 106 may retrieve the node corresponding to user "A" and convert all the properties of the node (e.g., the user name is "Jack") into text to return as the result of the query.

Archive 105 may store graph structures. Archive 105 may also implement the graph edits, deletions, and additions generated by converter 106. For example, archive 105 may add, alter, or delete any node, property, or edge. In an embodiment, archive 105 may routinely analyze the stored graph structure. Archive 106 may utilize Types to routinely gather data from the graph structure. For example, a "tagged in" edge may extend from user nodes to photo nodes, each of which are defined by a specific Type. Archive 105 may routinely count the number of "tagged in" edges to maintain how many photos there are of the user.

Type registry 104 may store all the Types for a particular graph structure. Type registry 104 maintains a listing of each EntityType, PropertyType, and RelationshipType. Type registry 104 may be used as a reference to determine if a graph conforms to a particular Type or to validate a particular graph structure. In an embodiment, Type registry 104 may be edited to alter Types, include new Types, or remove existing Types (such as unused Types or out-of-date Types).

Modeled data handler 107 may receive modeled data from graph interface 110. Modeled data handler 107 may receive data from a graph structure to present via data transferer 101 or API browser 108. For example, data transferer may transmit a query to graph interface 110 via raw data handler 102. Graph interface 110 may return the corresponding data from a graph structure as modeled data. Modeled data handler 107 may verify the modeled data and format it for presentation. For example, API browser may require specific formatting, such as the use of certain variable types. Modeled data handler 107 may, for example, convert a text file into an array of strings to present to API browser 108.

API browser 108 may allow programs and scripts to reference data from a graph structure. API browser 108 may allow function calls to graph interface 110 to return certain modeled data corresponding to a graph structure. API browser 108 may allow a developer to create a program that relies on a graph structure for primary memory storage.

Figure 2:
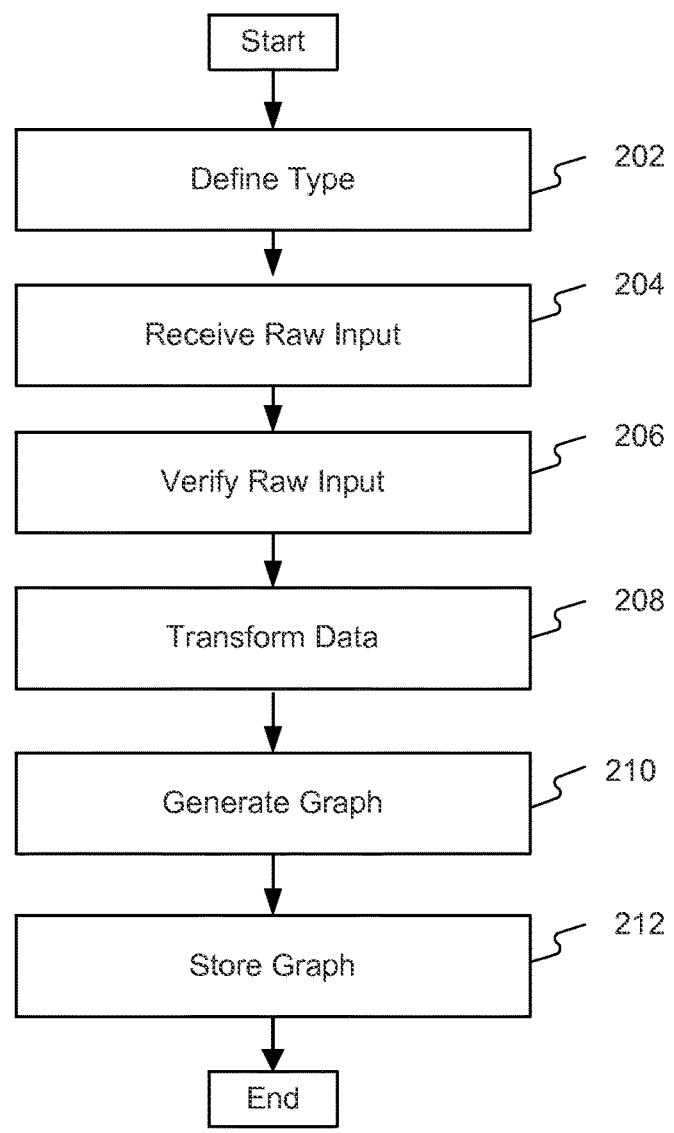
FIG. 2 illustrates a flowchart of an exemplary raw data conversion process, consistent with embodiments of the present disclosure.

FIG. 2 illustrates a flowchart of an exemplary graph storage process 200, consistent with embodiments of the present disclosure. As described below, exemplary process 200 may be implemented with one or more of the components illustrated in FIG. 1, but other arrangements and implementations are possible. In some embodiments, exemplary process 200 is implemented with one or more processors. Further, it should be understood that the steps of process 200 may be performed in any order to achieve the objects of the present disclosure. Therefore, the depicted order of FIG. 2 is merely exemplary.

In step 202, schema 103 may identify a Type. Schema 103 may reference Type registry 104 to identify a plurality of Types. For example, schema 103 may gather a list of potential types to attempt to match to raw data. The type may correspond to a model to use to convert raw data.

In step 204, data transferer 101 receives raw input. The raw input may come in individual transmissions or large batches. The batches may be organized and consist of the same pattern of raw data or the batches may contain disparate concatenated data. The raw data may include one or more data files (e.g., text files, photos, videos, audio files, etc.) and variables of any type (e.g., string, int, boolean, etc.). For example, the raw data may include a JPEG file with a title (string), caption (text), and date (int).

In step 206, raw data handler 102 may verify the raw data. Raw data handler may determine whether the raw data is suitable for forwarding to graph interface 110. For example, raw data handler may determine which fields are required, optional, and disallowed. Raw data handler may determine which fields are binary, as well as the input contained in the raw data, such as the type of file or variable stored in the raw data. For example, raw data handler may determine that the file type is a JPEG, corresponding to a photo having the optional fields of caption and date.

In step 208, converter 106 may transform the raw data. Converter 106 may modify the raw data in preparation for the appropriate graph structure. For example, converter may extract strings corresponding to username and security code from a text file. Converter 106 may also convert file types. For example, converter 106 may convert a GIF file to a JPEG file based on the requirements of the Type as defined in Type Registry 1044.

In an embodiment, converter 106 may verify the transformed data prior to generating a graph. Converter may determine that the conversion whether the conversion was successful in still accurately reflecting the raw data and being suitable for converting to a graph structure and the corresponding Type.

In step 210, converter 106 may generate a graph corresponding to the raw data. Converter 106 may generate nodes, properties, and edges based on the model and conforming to relevant Types. The graph structures may be defined as being relative to a particular existing node. For example, converter 106 may identify an edge between the existing node for user "A" and newly added node "G1" corresponding to an avionics club. Converter 106 may add additional new nodes for new users "B," "C," and "D," all of which, being members of the avionics club, have an edge to "G1."

In step 212, archive 105 may store the graph changes generated by converter 106. Archive 105 may modify an existing graph structure to implement additions, edits, and deletions from the graph structure. For example, archive 105 may delete an edge between the nodes corresponding user "A" ("Jack") and user "B" ("Sue") indicating they are classmates at the end of the semester when Jack and Sue no longer have classes together.

Figure 3:
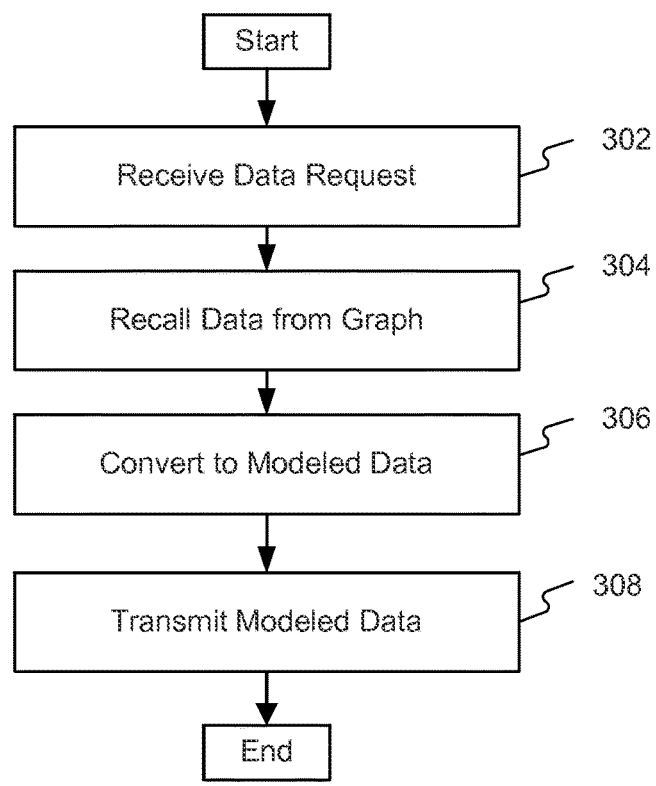
FIG. 3 illustrates a flowchart of an exemplary modeled data retrieval process, consistent with embodiments of the present disclosure.

FIG. 3 illustrates a flowchart of an exemplary graph retrieval process 300, consistent with embodiments of the present disclosure. As described below, exemplary process 300 may be implemented with one or more of the components illustrated in FIG. 1, but other arrangements and implementations are possible. In some embodiments, exemplary process 300 is implemented with one or more processors. Further, it should be understood that the steps of process 300 may be performed in any order to achieve the objects of the present disclosure. Therefore, the depicted order of FIG. 3 is merely exemplary.

In step 302, graph interface 110 may receive a data request. Data transferer 101 or API Browser 108 may require data stored in a graph structure of archive 105. For example, data transferer may receive a message requesting all photos that user "B" is "tagged in" that are dated after Jun. 11, 1999. API browser may call for the same data during execution of a script referencing the graph interface API.

In step 304, graph interface 110 may recall data from the graph. Archive 105 may identify the relevant portions of the stored graph structure. For example, archive 105 may identify the node corresponding to user "B." Archive 105 may detect all nodes connected to the node of user "B" via a "tagged in" edge. Archive 105 may aggregate all of those nodes which have a "date" property that is greater than Jun. 11, 1999, for example.

In another example, a URL may be a specific EntityType, with the EntityModel being the website address (e.g., "url=www.aol.com/test.html"). On the backend, the website address may be stored as raw text. However, Type registry 104 may automatically recognize what the raw text represents based on the EntityType definition. For example, Type registry 104 may recognize that the field (e.g., the raw text) is a URL based on the URL EntityType and dynamically produce an auxiliary field (e.g., a prefix or postfix to the raw text). For example, Type registry 104 recall the existing field "url=www.aol.com/test.html" and produce an auxiliary field dynamically "link=<a href='http://www.aol.com/test.html'>www.aol.com/test.html</a>", and another field "domain=www.aol.com."

Type registry 104 may also derive additional fields from existing data. In an embodiment, Type registry 104 may utilize existing data to derive data based relationships. For example, Type registry 104 may determine the number of "likes" of a particular photo on the fly, without the actual number of likes being stored. Types may be defined based on the preference of the database, whether to increase speed or reduce storage requirements.

In step 306, converter 106 may convert the corresponding graph structures into modeled data. Converter 106 may analyze the relevant portions of the graph structure to extract the requisite data, generating modeled data. For example, converter 106 may aggregate all of the image files that correspond to a node having a qualifying date and return them with the date and captions as strings. In another example, converter 106 may search photo metadata (e.g., ancillary tags in EXIF images) and create legal attribution links which may have been specified in the metadata. Converter 106 may convert the files to conform to specified file types, such as converting all image files to JPEG files.

In an embodiment, modeled data handler 107 may verify the modeled data. Modeled data handler 107 may determine whether the modeled data meets the presentation requirements for the data and that the modeled data is valid and free of errors. For example, modeled data handler 107 may determine whether the variable type or file type of the modeled data matches that of the expected return variable or file type. API browser 108 may expect an array of strings rather than a text file. In such an example, modeled data handler may determine that the modeled data is an array of strings or attempt to convert the modeled data into an array of strings. In certain embodiments, if the modeled data does not verify, modeled data handler 107 may transmit an error to API browser 108 (or data transferer 101, as the case may be). Modeled data handler 107 may further transmit an error message to graph interface 110 that may identify the cause of the error or re-request the necessary data.

In step 308, modeled data handler 107 may transmit the modeled data to the requesting entity. Modeled data handler 107 may send the modeled data to API browser 108 or data transferer 101, based upon the basis for the request. API browser 108 may return the modeled data to a script or program that called the API function. For example, a script may use the API to return the text of the image captions for user "B" to generate a word cloud for user "B" to use on a social network.

Figure 4:
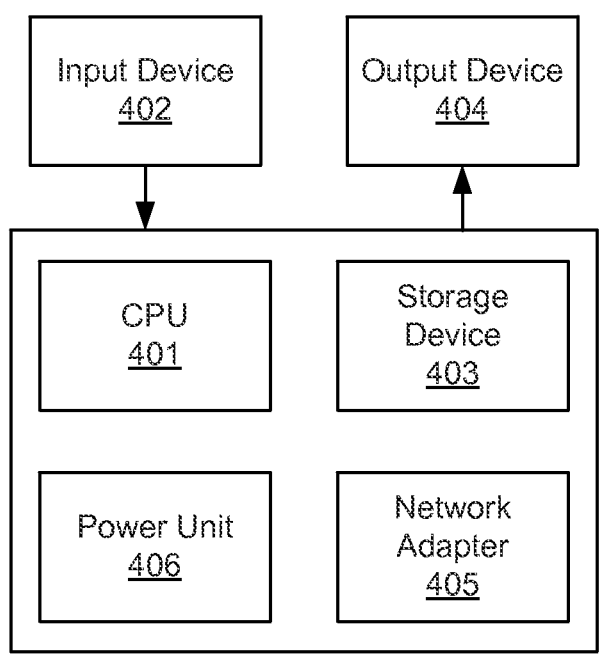
FIG. 4 illustrates an exemplary system for implementing embodiments of the present disclosure.

FIG. 4 illustrates an exemplary system 400 for implementing embodiments consistent with the present disclosure. Variations of system 400 may be used for implementing components or devices of the disclosed embodiments. It will be appreciated that the components and features represented in FIG. 4 may be duplicated, omitted, or modified. The number and arrangement of the components in FIG. 4 may also be modified.

As shown in FIG. 4, exemplary system 400 may include a central processing unit 401 (also referred to as an electronic processor or CPU) for managing and processing data, and performing operations, consistent with the present disclosure. (CPU 401 may be implemented as one or more processors.) System 400 also includes storage device 403. Storage device 403 may comprise optical, magnetic, signal, and/or any other type of storage device. System 400 may also include network adapter 405. Network adapter 405 may allow system 400 to connect to electronic networks, such as the Internet, a local area network, a wide area network, a cellular network, a wireless network, or any other type of network. System 400 also includes power unit 406, which may enable system 400 and its components to receive power and operate fully.

In some embodiments, system 400 may also include input device 402, which receive input from users and/or modules or devices. Such modules or devices may include, but are not limited to, keyboards, mice, trackballs, trackpads, scanners, cameras, and other devices which connect via Universal Serial Bus (USB), serial, parallel, infrared, wireless, wired, or other connections. System 400 also includes output device 404, which transmit data to users and/or modules or devices. Such modules or devices may include, but are not limited to, computer monitors, televisions, screens, projectors, printers, plotters, and other recording/displaying devices which connect via wired or wireless connections.

In this disclosure, various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Other implementations are also within the scope of the present disclosure.

It is to be understood that both the foregoing general description are exemplary and explanatory only, and are not restrictive. Further, the accompanying drawings, which are incorporated in and constitute a part of this specification, illustrate embodiments of the present disclosure and together with the description, and are similarly not restrictive.

What is claimed is:

1. A computer-implemented method for converting raw data into a graph structure for storage in a database, the method comprising the following operations performed by at least one processor:
    receiving raw data, wherein the raw data is comprised of at least one or more data types corresponding to text files, photos, videos, or audio files, and the data types are comprised of at least one or more variables corresponding to string, integer, or boolean;
    determining a model for the raw data, wherein the model defines the graph structure for the raw data, and determining the model comprises:
        identifying a plurality of stored models including required fields, optional fields, disallowed fields and field restrictions;
        determining whether the raw data includes the required fields, optional fields, disallowed fields and satisfies the field restrictions of both the required fields and the optional fields; and
        upon determining that the raw data includes disallowed fields, rejecting the raw data;
    converting the raw data to fit the model, wherein converting the raw data comprises:
        determining nodes based on a type of at least a portion of the raw data;
        determining at least one edge between nodes based on at least a portion of the raw data corresponding to at least one required field or at least one optional field;
        determining at least one property associated with at least one node based on at least a portion of the raw data corresponding to at least one required field or at least one optional field; and
        verifying whether the converted data accurately reflects the raw data prior to generating the graph structure;
    generating at least a portion of a graph based on the converted data and the model, wherein the graph produces modeled data; and
    archiving data representing the graph in the database.

2. The method of claim 1, wherein converting further comprises identifying potions of the raw data for each part of the structure.

3. The method of claim 1, wherein generating comprises generating, based on the converted data, at least one of: a node, an edge, and a property.

4. The method of claim 1, wherein the method further comprises the following operation:
    receiving additional raw data;
    determining, based on the additional raw data, an update to the graph;
    performing, based on the update, at least one action on the graph to create an updated graph, wherein the at least one action is at least one of: editing a property of a node of the graph, deleting a property, an edge, or a node of a graph, or adding a new node, edge or property to the graph; and
    archiving the updated graph.

5. The method of claim 1, wherein the method further comprises the following operation:
    verifying the raw data by determining the required fields for the raw data, identifying the input model, and determining the storage format.

6. The method of claim 1, wherein the method further comprises the following operations:
    receiving a request for modeled data;

identifying the graph entities corresponding to the modeled data;
converting the identified graph entities to modeled data; and
transmitting the modeled data.

7. The method of claim 1, further comprising:
determining whether the raw data needs to be reformatted to meet the field restrictions; and
when it is determined that reformatting of the raw data is needed, reformatting the raw data to be an array of strings based on the field restrictions of the model.

8. The method of claim 1, further comprising:
determining whether the raw data includes an image file in a file format that is not supported by the field restrictions; and
converting the image file to have a different file format that matches the field restrictions of the model.

9. A system for converting raw data into a graph structure for storage in a database, comprising:
a storage device that stores instructions; and
at least one processor that executes the instructions in order to:
receive raw data, wherein the raw data is comprised of at least one or more data types corresponding to text files, photos, videos, or audio files, and the data types are comprised of at least one or more variables corresponding to string, integer, or boolean;
determine a model for the raw data, wherein the model defines the graph structure for the raw data, and to determine the model for the raw data, the instructions are configured to cause the at least one processor to:
identify a plurality of stored models including required fields, optional fields, disallowed fields and field restrictions;
determine whether the raw data includes the required fields, optional fields, disallowed fields and satisfies the field restrictions of both the required fields and the optional;
upon determining that the raw data includes disallowed fields, rejecting the raw data;
convert the raw data to fit the model, wherein converting the raw data comprises:
determining nodes based on a type of at least a portion of the raw data;
determining at least one edge between nodes based on at least a portion of the raw data corresponding to at least one required field or at least one optional field;
determining at least one property associated with at least one node based on at least a portion of the raw data corresponding to at least one required field or at least one optional field; and
verifying whether the converted data accurately reflects the raw data prior to generating the graph structure;
generate at least a portion of a graph based on the converted data and the model, wherein the graph produces modeled data; and
archive data representing the graph in the database.

10. The system of claim 9, wherein to convert the raw data, the instructions are further configured to identify potions of the raw data for each part of the structure.

11. The system of claim 9, wherein to generate at least the portion, the instructions are configured to generate, based on the converted data, at least of:
a node, an edge, and a property.

12. The system of claim 9, wherein the instructions are further configured to cause the at least one processor to:
receive additional raw data;
determine, based on the additional raw data, an update to the graph;
perform, based on the update, at least one action on the graph to create an updated graph, wherein the at least one action is at least one of:
editing a property of a node of the graph, deleting a property, an edge, or a node of a graph, or adding a new node, edge or property to the graph; and
archive the updated graph.

13. The system of claim 9, wherein the instructions are further configured to cause the at least one processor to:
verify the raw data by determining the required fields for the raw data, identifying the input model, and determining the storage format.

14. The system of claim 9, wherein the instructions are further configured to cause at least one processor to:
receive a request for modeled data;
identify the graph entities corresponding to the modeled data;
convert the identified graph entities to modeled data; and
transmit the modeled data.

15. A non-transitory computer-readable medium storing instructions, the instructions configured to cause at least one processor to perform operations comprising:
receiving raw data, wherein the raw data is comprised of at least one or more data types corresponding to text files, photos, videos, or audio files, and the data types are comprised of at least one or more variables corresponding to string, integer, or boolean;
determining a model for the raw data, wherein the model defines the graph structure for the raw data, and determining the model for the raw data comprises:
identifying a plurality of stored models including required fields, optional fields, disallowed fields and field restrictions;
determining whether the raw data includes the required fields, optional fields, disallowed fields and satisfies the field restrictions of both the required fields and the optional fields;
upon determining that the raw data includes disallowed fields, rejecting the raw data;
converting the raw data to fit the model, wherein converting the raw data comprises:
determining nodes based on a type of at least a portion of the raw data;
determining at least one edge between nodes based on at least a portion of the raw data corresponding to at least one required field or at least one optional field;
determining at least one property associated with at least one node based on at least a portion of the raw data corresponding to at least one required field or at least one optional field;
verifying whether the converted data accurately reflects the raw data prior to generating the graph structure;
generating at least a portion of a graph based on the raw data and the model, wherein the graph produces modeled data; and
archiving data representing the graph in a database.

16. The computer-readable medium of claim 15, wherein converting further comprises identifying potions of the raw data for each part of the structure.

17. The computer-readable medium of claim 15, wherein generating comprises generating, based on the converted data, at least one of: a node, an edge, and a property.

18. The computer-readable medium of claim 15, wherein the instructions are further configured to cause the at least one process to perform the following operations:
- receiving additional raw data;
- determining, based on the additional raw data, an update to the graph;
- performing, based on the update, at least one action on the graph to create an updated graph, wherein the at least one action is at least one of: editing a property of a node of the graph, deleting a property, an edge, or a node of a graph, or adding a new node, edge or property to the graph; and
- archiving the updated graph.

19. The computer-readable medium of claim 15, wherein the instructions are further configured to cause the at least one processor to perform the following operations:
- verifying the raw data by determining the required fields for the raw data, identifying the input model, and determining the storage format.

\* \* \* \* \*

UNITED STATES PATENT AND TRADEMARK OFFICE
CERTIFICATE OF CORRECTION

PATENT NO. : 10,290,126 B2
APPLICATION NO. : 14/557410
DATED : May 14, 2019
INVENTOR(S) : Travis Adam Walker et al.

Page 1 of 1

It is certified that error appears in the above-identified patent and that said Letters Patent is hereby corrected as shown below:

In the Claims

Claim (3), Column (10), Line (43), delete "potions of a" and insert --portions of a--

Claim (10), Column (11), Line (63), delete "potions of the" and insert --portions of the--

Claim (17), Column (12), Line (63), delete "potions of the" and insert --portions of the--

Signed and Sealed this
Fifteenth Day of October, 2019

Andrei Iancu
*Director of the United States Patent and Trademark Office*